Figure 1:
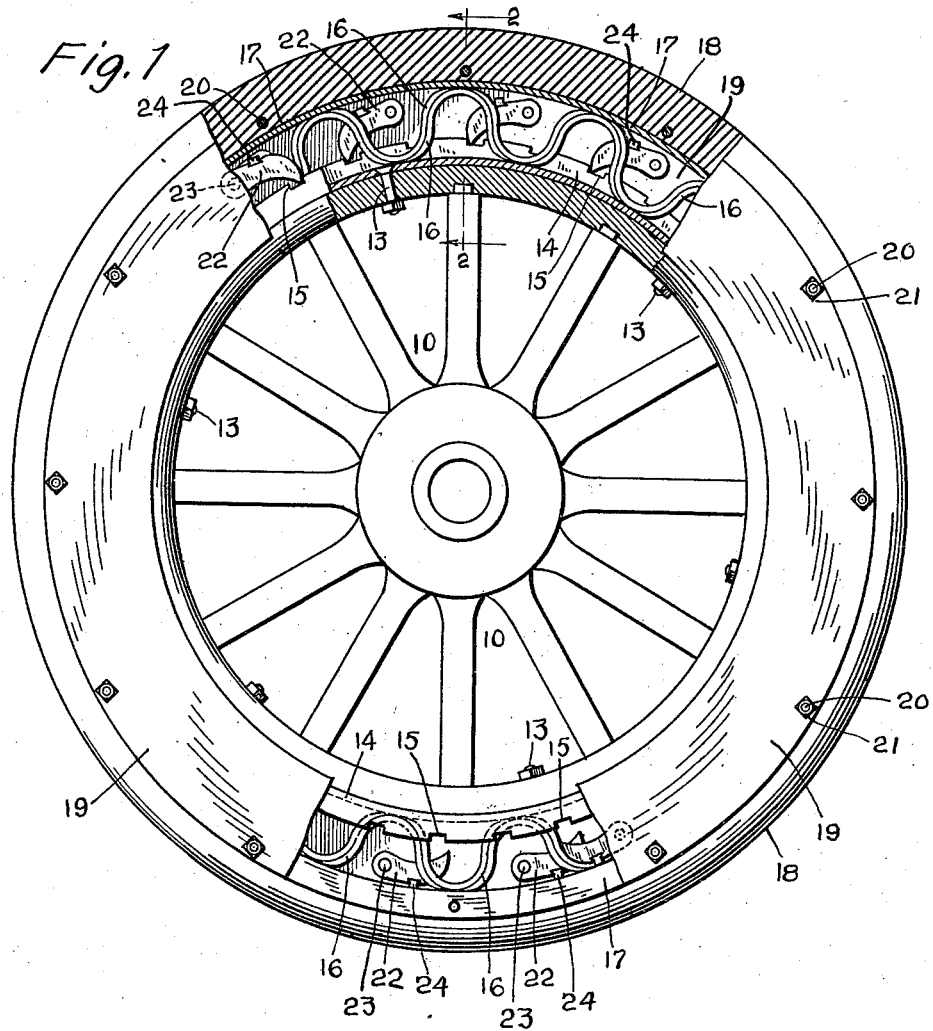

A. A. CURRY.
RESILIENT TIRE.
APPLICATION FILED JAN. 19, 1911.

996,839.

Patented July 4, 1911.

WITNESSES:
H. W. Meade
S. W. Atherton

INVENTOR
Alfred A. Curry
BY
A. M. Wooster
ATTORNEY

UNITED STATES PATENT OFFICE.

ALFRED A. CURRY, OF BRIDGEPORT, CONNECTICUT, ASSIGNOR OF ONE-HALF TO EDWIN B. KNOWLES AND ONE-TWENTIETH TO CHARLES S. CANFIELD, BOTH OF BRIDGEPORT, CONNECTICUT.

RESILIENT TIRE.

996,839.          Specification of Letters Patent.          Patented July 4, 1911.

Application filed January 19, 1911. Serial No. 603,485.

*To all whom it may concern:*

Be it known that I, ALFRED A. CURRY, a citizen of the United States, residing at Bridgeport, county of Fairfield, State of Connecticut, have invented an Improvement in Resilient Tires, of which the following is a specification.

This invention has for its object to provide a simple, durable and inexpensive resilient tire for vehicles, more especially motor cars and trucks, which shall have to the fullest extent the yielding and easy riding qualities of pneumatic tires without any of the objections that are inherent in pneumatic tires.

With these and other objects in view I have devised the simple and novel resilient tire, of which the following description in connection with the accompanying drawing is a specification, reference characters being used to indicate the several parts.

Figure 2:
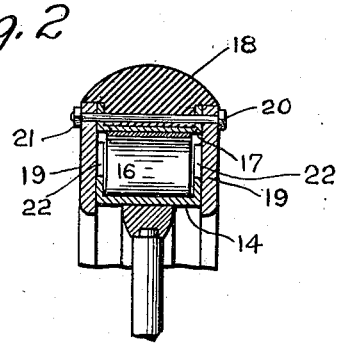

Figure 1 is a side elevation illustrating my novel tire as in use on a wheel, portions of the wheel and tire being broken away to show the structure; and Fig. 2 is a transverse section on the line 2—2 in Fig. 1, looking in the direction of the arrows.

10 denotes a wheel which may be of any ordinary or preferred construction. Outside the felly of the wheel and rigidly secured thereto as by bolts 13 is an inner rim 14 provided with angular notches 15. I preferably use a channel rim and form the notches in the side flanges thereof. Resting upon the inner rim and unsecured thereto are rounded U-shaped springs 16. Each alternate spring is inverted and lies between the contiguous springs, the ends of the springs being turned outward and tapered down to a relatively thin edge. The springs are all alike and the inverted springs fit within the contiguous springs, their surfaces being in contact, as clearly shown.

17 denotes an outer rim, preferably an outwardly facing channel rim, which rests upon the arches of alternate springs and upon the outwardly turned ends of the inverted springs but is unsecured to the springs.

18 denotes the tread which is secured to the outer rim as by bolts 20 which pass through the tread and also through the flanges of the rim. The tread may be made of any durable and relatively inexpensive material other than metal, for example fiber, a rubber compound or any analogous plastic material that can be molded to form.

19 denotes ring-shaped side plates which extend to or approximately to the edges of the flanges of the outer rim and preferably below the base of the inner rim, the tread being formed to overlie the outer edges of the side plates as clearly shown in Fig. 2. The side plates are shown as secured to the flanges of the outer rim by bolts 20 which also pass through the tread. These bolts are secured in place by nuts 21 leaving the parts readily removable.

22 denotes dogs which are pivoted to the respective side plates, as at 23, and engage the angular notches 15 in the inner rim. It should be noted that the dogs carried by the respective side plates extend in opposite directions as clearly shown in Fig. 1, the dogs on the near side engaging the notches in the near flange of the inner rim and the dogs on the far side engaging the notches in the far flange of said rim. In order to render the action of the dogs practically noiseless when they drop out of the notches in the inner rim and against the outer rim as at the bottom in Fig. 1, I provide dove-tail notches in the backs of the dogs and insert therein pads or blocks 24 of leather, rubber or any suitable noiseless material.

In use, the weight and all shocks and blows are taken up by the springs which yield more or less, depending of course upon the weight carried and the speed and roughness of the roadway.

It will be understood from the drawing that while the inner rim is rigidly secured to the wheel the outer rim is connected to the inner rim by the dogs only and is free to oscillate relatively to the inner rim, the amount of oscillation depending of course upon the yield of the springs, and the extreme amount of oscillation being limited by the engagement of one set of dogs or the other with the forward ends of the angular notches in the corresponding side of the inner rim. The resiliency of the wheel, in brief, is produced by the yielding of the springs and the oscillatory movement of the tread, outer rim and side plates relatively to the inner rim.

In order to obtain access to the springs for any purpose whatever, it is simply necessary to remove nuts 21 and the near side plate as seen in Fig. 1.

Having thus described my invention I claim:

1. A resilient tire comprising an inner rim, a series of disconnected nested complemental U-shaped springs alternately inverted and resting on said inner rim, an outer rim resting on and supported by said springs, means carried by the outer rim for detachably engaging the inner rim to secure the outer rim and permit oscillation thereof relative to the inner rim, said means being located to one side of said springs.

2. A resilient tire comprising an inner rim, a series of U-shaped springs alternately inverted resting thereon, an outer rim resting on the springs, side plates secured to the outer rim and dogs pivoted to the respective side plates and engaging the inner rim, whereby oscillation of the outer rim is permitted when the springs yield.

3. A resilient tire comprising an inner rim having notches, a series of U-shaped springs alternately inverted resting on said rim, an outer rim resting on said springs, side plates secured to the outer rim and dogs pivoted to the respective side plates and engaging the notches in the inner rim, the dogs on the respective side plates extending in opposite directions.

4. A resilient tire comprising an outwardly facing channel rim having notches in the flanges, a series of springs resting on said rim, an outer rim resting on the springs, side plates secured to the outer rim and oppositely extending dogs pivoted to the respective side plates and engaging notches in the inner rim.

5. A resilient tire comprising an inner channel rim having notches, a series of U-shaped springs alternately inverted resting on said rim, an outer rim resting on the springs, side plates and a tread secured to the outer rim and oppositely extending dogs pivoted to the side plates and adapted to engage the inner rim.

6. A resilient tire comprising an inner rim, a series of U-shaped springs alternately inverted resting thereon, the outer ends of said springs being outwardly turned and beveled, an outer rim resting on the arches of alternate springs and on the beveled ends of the inverted springs and means for securing the outer rim and permitting oscillation thereof relatively to the inner rim.

7. A resilient tire comprising an inner rim, a series of U-shaped springs alternately inverted resting thereon, the outer ends of said springs being outwardly turned and beveled, an outer rim resting on the arches of alternate springs and on the beveled ends of the inverted springs, side plates secured to the outer rim and oppositely extending dogs pivoted to the respective side plates and adapted to engage the inner rim.

8. A resilient tire comprising an inner rim, a series of springs resting thereon but not attached thereto, an outer rim resting on the springs but not attached thereto, side plates secured to the outer rim and dogs pivoted to the respective side plates and adapted to engage the inner rim.

9. A resilient tire comprising an inner rim, a series of U-shaped springs alternately inverted resting thereon, an outer rim resting on the springs, side plates secured to the outer rim and dogs pivoted to the respective side plates and engaging the inner rim, said dogs being provided on their backs with pads of noiseless material which engage the outer rim when the dogs drop out from the notches.

In testimony whereof I affix my signature in presence of two witnesses.

ALFRED A. CURRY.

Witnesses:
 A. M. WOOSTER,
 S. W. ATHERTON.